Feb. 11, 1936.  G. L. USSELMAN  2,030,125
FREQUENCY MODULATION APPARATUS
Filed Sept. 25, 1933  2 Sheets-Sheet 2

INVENTOR
G.L. USSELMAN
BY
ATTORNEY

Patented Feb. 11, 1936

2,030,125

UNITED STATES PATENT OFFICE 2,030,125

FREQUENCY MODULATION APPARATUS

George Lindley Usselman, Port Jefferson, N. Y., assignor to Radio Corporation of America, a corporation of Delaware Application September 25, 1933, Serial No. 690,805

9 Claims. (Cl. 179—171)

This invention relates to frequency modulation apparatus and especially to frequency modulation transmitters. In the copending application of C. W. Hansell, Serial Number 463,614, filed June 25, 1930, there is disclosed a system for producing frequency modulated waves by means of two line controlled oscillation generators. The line controlled generators are adjusted so as to normally operate on opposite sides of a mean frequency and are then locked or coupled together so as to operate at that mean frequency. By oppositely varying the strengths of the oscillations generated by each oscillation generator, the resultant output is frequency modulated as desired.

My present invention relates to a somewhat similar system but it has as its principal object the simplification of the Hansell system. According to my present invention, only a single line for frequency control is necessary to react upon the oscillation generators so as to cause them to operate, though adjusted differently, at a mean operating frequency. As before, by varying the relative strengths of the oscillations produced, the frequency of the resultant output shifts towards the natural frequency of that oscillator which is supplying the greater amount of power.

Figure 1:
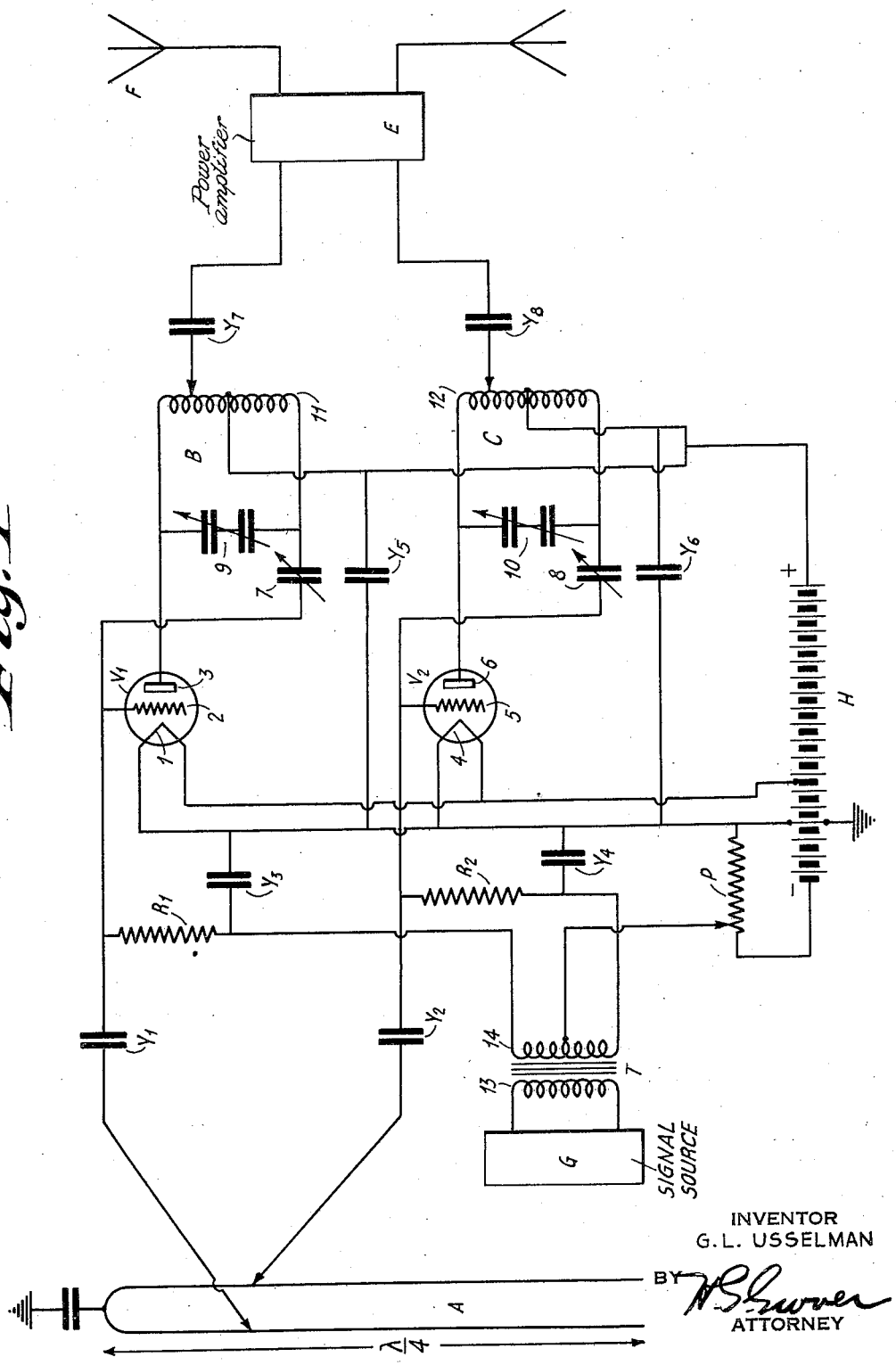
Figure 2:
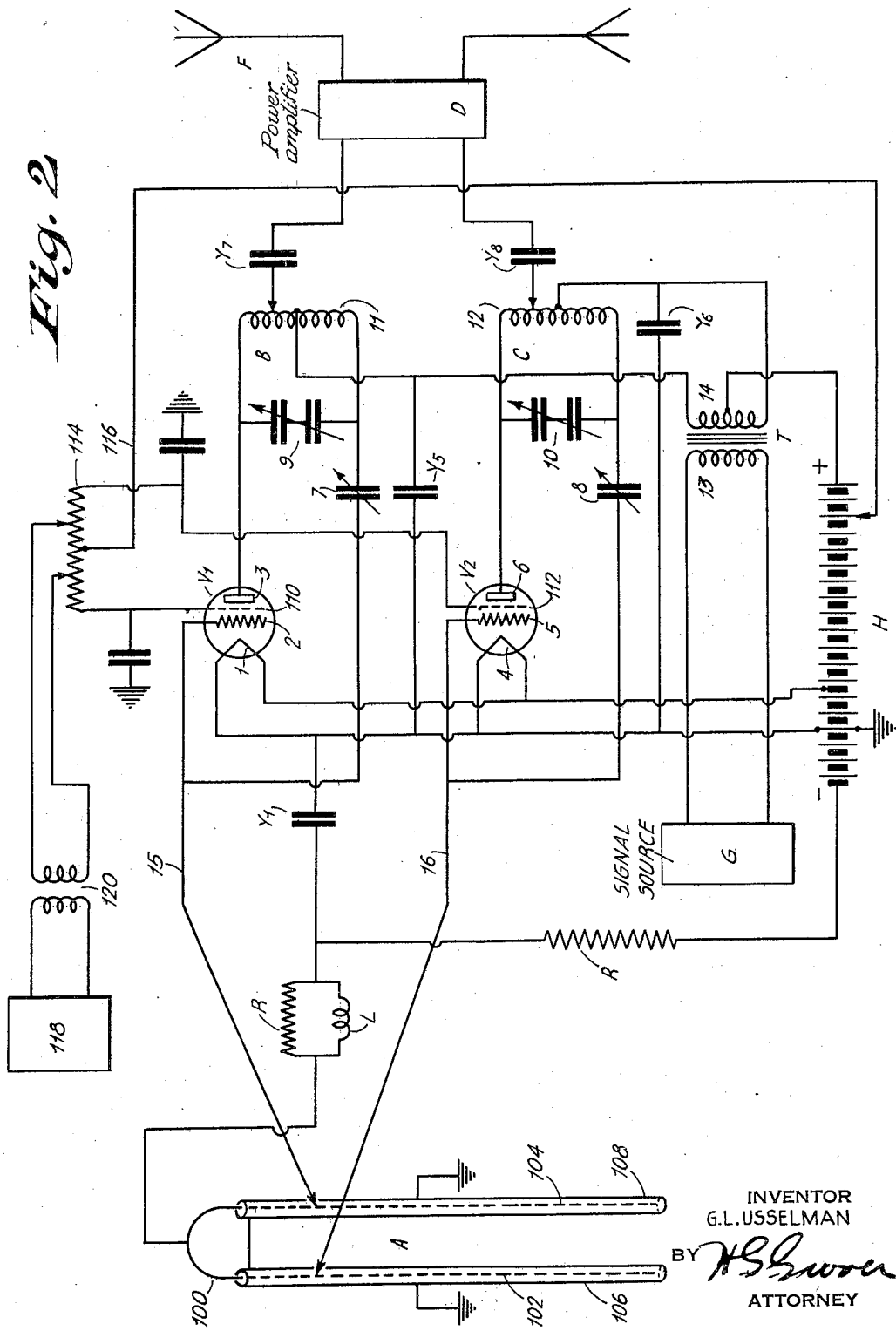

My present invention is more fully described in connection with the accompanying drawings wherein Figure 1 is a wiring diagram of a frequency modulated line controlled transmitter, modulating potentials being applied to the grids of a pair of oscillation generators adjusted as to operate when isolated at opposite sides of a mean operating frequency; and, Figure 2 illustrates a modification of the arrangement shown in Figure 1.

Turning to Figure 1 the vacuum tube or electron discharge device V1 is provided with a cathode or filament 1, a grid or control electrode 2 and an anode or plate electrode 3. These electrodes are regeneratively coupled together by means of a tuned tank or anode circuit B provided with an inductance coil 11 and tuning condenser arrangement 9. Feed back from the tank circuit B is established through the variable feed back condenser 7 which at the higher frequencies is preferably adjusted so as to cause over neutralization of the vacuum tube V1. Anode potential is supplied from a suitable potential source H here shown as a battery but which may be replaced by a motor generator or by any suitable rectifier potentiometer system.

Similarly the vacuum tube V2 provided with a filament or cathode 4 a grid or control electrode 5 and an anode or plate electrode 6 is regeneratively connected to another tunable tank circuit C having an inductance coil 12 and a tuning condenser arrangement 10. Feed back for vacuum tube V2 is provided for by means of variable condenser 8. Condensers $y5$, $y6$ and incidentally condensers $y3$, $y4$ are by-passing condensers serving to connect the plate potential leads and the leads to modulating transformer 14 directly to the cathodes 1 and 4 and ground for radio frequency currents.

Energy from the tank circuit B is fed by way of a coupling condenser $Y_7$ to the power amplifier E. Energy from the tank circuit C is fed by way of a coupling condenser $Y_8$ to the power amplifier E.

Grid bias is obtained partially from potentiometer P and supplied through the secondary 14 of transformer T as illustrated and resistors R1, R2 to the grids. Additional bias is obtained by rectification action engendering bias voltages across leak resistors R1 and R2.

The tank circuits B and C are adjusted and tuned so that the oscillations produced by generator V1 and the oscillations produced by generator V2 lie in frequency on opposite sides of a mean operating frequency. Both oscillators under no signal conditions will operate by virtue of their coupling to the frequency controlling transmission line A at the intermediate operating frequency when, of course, tubes V1, V2 and their associated circuits are adjusted so as to operate at substantially the same power output and at substantially the same efficiency.

The frequency controlling transmission line A as illustrated consists preferably of a single looped or U-shaped conductor of low loss preferably made in the form of a continuous hollow tube and shielded as described more fully in the copending application of C. W. Hansell, Serial Number 692,093, filed October 4, 1933. The grid 2 of vacuum tube V1 is connected through radio frequency by-passing condenser $y1$ to one leg of the U-shaped line and the grid 5 of the other vacuum tube V2 is connected through by-passing condenser $y2$ to the other leg of the U-shaped frequency controlling line A which preferably is made to have an overall length of one-quarter wave length at the intermediate frequency.

In operation the frequency controlling line A tends to oscillate at a constant frequency. This constant frequency as pointed out before is intermediate the tuned frequencies of the circuits B and C which are tuned slightly to opposite sides of the normal frequency represented by the adjustment of the line A. When no signal is fed from the source G into the transformer T, and assuming that the tubes V1 and V2 receive equal bias, both tubes V1 and V2 will deliver equal energy at reduced efficiency and identical frequency to the power amplifier E and from the amplifier into the antenna F. However, as signals are applied from the source G into the primary 13 of transformer T and thence into the secondary 14 of transformer T, the oscillators V1, V2 will be differentially modulated so that the total power supplied to the power amplifier will be the same but despite that it will be found that there will be a frequency shift towards the frequency of either circuit B or C depending upon whether or not tube V1 or tube V2 is delivering more power.

Naturally that tube supplying the greater amount of energy will be operating more efficiently and will therefore supply more power to the line A as well as to the power amplifier E. This will pull the line or controlling frequency towards the frequency for which the tank circuit of the more powerful oscillator is tuned giving as a consequence a frequency modulated output in the antenna F. From what has gone on before therefore each oscillator influences or pulls the line A frequency on alternate half cycles of the signal resulting in constant output power but frequency varied. Stated a little differently the resultant energy transmitted from the antenna F will be constant in amplitude but varied in frequency.

In the arrangement shown in Figure 2 the line construction is given in a little greater detail. The line A consists of the single looped conductor 100 having the substantially straight legs 102, 104, in turn having uniformly distributed inductance and capacity. The U-shaped conductors 102, 100, 104, are preferably made of a hollow tube, and the linear legs 102, 104 are insulatingly supported within the grounded metallic tubes 106, 108. As described in the copending application of C. W. Hansell, Serial Number 692,093, filed October 4, 1933, it is preferable to make the ratio of the inside diameter of the outer tube to the outside diameter of the inner tube between 2.5 and 5 and preferably of the value, approximately, 3.6.

Also in Figure 2 a major portion of the bias for tubes V1 and V2 is obtained through resistor R, by way of parasitic trap RL to center tap on line A and leads 15 and 16 to grids 2 and 5 respectively. Regeneration is obtained as before through condensers 7 and 8 from oscillating circuits B and C. Tank circuits 9 and 11, and 10 and 12 are tuned on each side of the frequency of line A as previously described. The amplitudes of the oscillations in oscillators B and C are differentially modulated in amplitude by the signal. This is accomplished by modulating the anode voltage of tubes V1 and V2 by signal source G through transformer T as indicated in Figure 2 or other means. By this scheme the frequency of line A is pulled toward that of the oscillator supplying the more feedback energy. With this circuit—Figure 2—as with the circuit shown in Figure 1, the amplitude of the output signal is constant but the frequency of it is modulated according to the frequency and intensity of the input signal.

If desired, the tubes V1, V2 may be provided with screen girds 110, 112 connected to potentiometer 114 which is supplied at its midpoint from source H through conductor 116. In that case the modulating voltages from a suitable source 118 may be impressed across a portion of the potentiometer 114 through the intermediary of a transformer 120. Also, if desired, both systems of modulation shown in Figure 2 may be used in which case the primary of transformer 120 would be connected in parallel with the primary 13 of transformer T. In fact, any combination or all three methods of modulation shown in Figures 1 and 2 may be used simultaneously, each impressing the same signal. Or in the event that it is desired to transmit multiplex signals the signal sources may be connected as shown in Figures 1 and 2 but should, of course, be sources of different tone frequencies which at the receiving end may be isolated by means of filters so that the transmitted signals may be separated out.

Having thus described my invention what I claim is:

1. A frequency modulation system comprising a pair of thermionic oscillation generators each having input and output electrodes connected in circuits adjusted so as to normally operate on opposite sides of a mean operating frequency, a U-shaped frequency controlling transmission line, circuits coupling a control electrode of each of said oscillation generators to said line whereby said generators both operate at said mean operating frequency, a common output circuit, separate tuned tank circuits connected to the output electrodes of each tube for feeding energy from each of said generators to said common output circuit, and means for varying the relative strengths of oscillations generated by each of said oscillation generators whereby the frequency of energy in said common output circuit is varied.

2. A frequency modulation system comprising an electron discharge device having anode cathode and control electrodes, means for regeneratively coupling together said electrodes so as to cause the generation of oscillations at a frequency on one side of the desired mean operating frequency, a vacuum tube having plate grid and filament electrodes, means for coupling said plate grid and filament electrodes together so as to cause the generation of oscillations at a frequency on the other side of a mean operating frequency, a single U-shaped conductor having substantially linear legs relatively close together, a connection from said control electrode to one of the legs of said U-shaped conductor, a connection from the grid electrode to the other leg of said U-shaped conductor, a connection from the trough portion of said U-shaped conductor to said filament and cathode electrodes, said connection including the shunt combination of a resistor and an inductor, said U-shaped inductor serving to lock the oscillations generated by said tube and device at said common intermediate frequency, and means for varying the relative strengths of the oscillations generated by said tube and device whereby the common operating frequency of tube and device is varied with respect to said mean intermediate frequency.

3. A system as recited in claim 1, in which said U-shaped transmission line comprises a pair of closely spaced conductors having uniformly distributed inductance and capacity.

4. A system as recited in claim 1, in which the input electrodes of each of said thermionic oscillation generators comprises a control electrode, and in which, said last named means comprises circuits applying modulating voltages to said control electrodes to simultaneously vary the voltages on said control electrodes in phase opposition.

5. A system as recited in claim 1, in which the output electrodes of each of said thermionic oscillation generators comprises an anode electrode and in which said last named means comprises circuits coupling said anode electrodes in phase opposition to a source of modulating potentials whereby the potentials on said anode electrodes are varied simultaneously in phase opposition when said circuits are energized.

6. A frequency modulation system comprising a pair of electron discharge devices each having anode, cathode and control electrodes, circuits regeneratively coupling the electrodes of each device to produce therein oscillations of different frequencies lying on opposite sides of a mean frequency when said electrodes are energized, a single U-shaped conductor having substantially linear legs which are relatively close together, the length of said conductor being a multiple of a quarter wave length of said mean frequency, circuits connecting different points on said U shaped conductor to the control electrodes of each tube and a point intermediate the legs of said conductor to the cathode of both of said tubes, said U shaped conductor serving to entrain said devices and circuits to produce oscillations at said mean frequency, and circuits applying modulating potentials in phase opposition to like electrodes in said devices.

7. A device as recited in claim 6, in which each of said discharge devices also includes an additional grid-like electrode and in which said like electrodes connected in phase opposition by said last named circuits are the additional grid-like electrodes.

8. A device as recited in claim 6, in which said last named like electrodes are the anode electrodes of said discharge devices.

9. A device as recited in claim 6, in which each of said discharge devices also includes an additional grid-like electrode and in which an additional source of potential is connected in phase opposition with said additional grid-like electrodes.

GEORGE LINDLEY USSELMAN.